United States Patent [19]

Frey et al.

[11] Patent Number: 4,727,577
[45] Date of Patent: Feb. 23, 1988

[54] METHOD OF AND APPARATUS FOR RECORDING INFORMATION ON THE ACCUMULATED USAGE OF A TRUNK

[75] Inventors: Alan E. Frey, Naperville; Di-Jen Leu, Hanover Park, both of Ill.

[73] Assignee: American Telephone and Telegraph Company, AT&T Bell Laboratories, Murray Hill, N.J.

[21] Appl. No.: 869,128

[22] Filed: May 30, 1986

[51] Int. Cl.$^4$ .......................................... H04M 15/32
[52] U.S. Cl. ..................................... 379/112; 379/115
[58] Field of Search ............................. 379/111-116, 379/119-122, 124-128, 133-138

[56] References Cited

U.S. PATENT DOCUMENTS

| | | | |
|---|---|---|---|
| 1,532,391 | 4/1925 | Erickson | 379/114 |
| 1,747,210 | 2/1930 | Babcock | 379/121 X |
| 2,075,056 | 3/1937 | Rich | 379/122 |
| 3,934,095 | 1/1976 | Matthews et al. | 379/114 X |
| 4,085,293 | 4/1978 | Karras | 379/137 |
| 4,200,771 | 4/1980 | Kraushaar et al. | 379/138 |

Primary Examiner—Jin F. Ng
Assistant Examiner—Mark E. Ham
Attorney, Agent, or Firm—Richard J. Godlewski

[57] ABSTRACT

Method and apparatus are disclosed for recording information on the accumulated usage of a group of trunks interconnecting two networks. The apparatus includes two usage records that are alternately designated primary and secondary usage records during successive ones of consecutive time periods. In response to a call on a trunk, the primary usage record is decremented by an amount representing the time interval between the start of a given period and the commencement of trunk use. During the period, each trunk connected to a network office is examined for use once during the period. When a selected trunk is found in use, the secondary usage record is incremented by an amount representing the interval of time in the previously occurring time period. When the secondary usage record has not been updated for the selected trunk, the secondary usage record is decremented by an amount representing the previous interval of time to adjust the secondary usage record for calls occurring prior to the trunk being checked for use. When a call is terminated on a trunk, the primary usage record is incremented by an amount representing the interval time between the start of the period and the termination of the call. In addition, the secondary usage record is incremented by an amount representing the interval of time in the previous time period when the trunk has not been checked for use. At the end of each period, the primary and secondary designations of the two records are exchanged for use during the next time period.

61 Claims, 7 Drawing Figures

FIG. 6 TRUNK GROUP USAGE RECORD

FLOW/STRUCTURE DIAGRAM

METHOD OF AND APPARATUS FOR RECORDING INFORMATION ON THE ACCUMULATED USAGE OF A TRUNK

TECHNICAL FIELD

This invention relates to telecommunications systems and particularly to a method of and apparatus for recording information on the accumulated usage of a trunk, for example, at an interconnect carrier office to determine access charges assessed by a local exchange telephone company against an interconnect carrier, such as AT&T for calls between a local exchange carrier telephone office and an interconnect carrier telephone office.

BACKGROUND OF THE INVENTION

As a result of the divestiture of AT&T, local exchange carriers now bill interconnect carriers access charges for customer call attempts originating from the local exchange carrier network to the interconnect carrier and for the time the customer is connected to the interconnect carrier. In addition, the local exchange carriers also bill the interconnect carrier for the time completed calls terminate on the local exchange carrier network. These charges are also based on the distance between the local exchange carrier end office and a point of presence in the interconnect carrier network such as a toll interconnect carrier switching office. Charges may also differ based on the type of service or whether the call is, for example, intra/interstate, inter-/intra LATA, international, or special service such as "800" type calls.

There are a number of prior art methods for recording information on trunk usage and determining access charges. For equal access local exchange carrier offices, one technique is to record automatic message accounting (AMA) records for each originating call attempt and terminating call completion. The cost of telephone office equipment to generate these AMA records and the cost of off-line processing for the generated records is enormous and not cost effective. Per call records are not required to determine access charges and are unnecessary particularly when only those AMA records associated with completed calls are necessary for charging the customer. With non equal access local exchange carrier telephone offices, AMA records for completed calls and traffic usage measurements are used to approximate originating call attempts and terminating call completions. Furthermore, time charges are likewise approximated based on the AMA call completion records and traffic usage measurements. A problem with this approximation technique is the inherent error for approximated call attempts, the type of call, usage time, and the number of terminating completions. With billions of dollars being paid from just AT&T to local exchange carriers, approximation errors can easily result in several hundreds of millions of dollars in excess access charges.

Present methods for verifying access charges levied by the local exchange carriers include various types of sampling techniques. For instance, the interconnect carrier may purchase a sample of all of the AMA records generated by the local exchange carrier to determine originating call attempts, type of service, trunk usage, and terminating call completions. This sample is only from AMA call completion records. Again, at best, this sampling technique has inherent errors which again can produce hundreds of millions of dollars in excess access charges. Furthermore, the cost of the sample from the local exchange carrier and the processing of these call details has resulted in enormous processing fees.

SUMMARY OF THE INVENTION

The foregoing problems are solved and a technical advance is achieved by method of and apparatus for recording information on the usage of a trunk rather than individual per call usage records, for example, to determine access charges for calls between a local exchange carrier telephone office and an interconnect carrier telephone office.

In the illustrative embodiment of the invention, the apparatus includes memory for storing two usage records for each trunk group that are alternately designated primary and secondary usage records by address pointers during successive periods of time. During a given time period, a commencement process included, for example, in the apparatus adjusts the primary usage record by decrementing the record by an amount representing the interval of time from the start of the period to the commencement of use of a trunk each time the use of a trunk in the group is commenced during the period. In a similar manner during the period, a termination process adjusts the primary usage record by, for example, incrementing the record by an amount representing the interval of time from the start of the period to the termination of use of a trunk each time the use of a trunk in the group is terminated during the period. A technical advantage is that the actual usage of a group of trunks is accumulated over a given period of time by adjusting a usage record based on the interval of time from the start of the period to the commencement or termination of use of any trunk in the group without regard as to whether or not the corresponding termination or commencement of the trunk use occurs in the same period.

At the end of each period, a check process checks each trunk in the group for use at the end of the period. When a trunk is determined to be in use at the end of the period, first adjustment means such as an incrementor responsive to the check process adjusts the accumulated usage record by, for example, incrementing the record by an amount representing the interval of time in the given period each time a trunk is determined to be in use at the end of the period.

To check each trunk in the group for use at the end of a given period, the check process checks each trunk in the group for use once during the next consecutive time period. When a checked trunk is in use, the usage record associated with the previous time period is adjusted by, for example, incrementing the record for the interval of time in the previous time period.

Should the use of a trunk commence or terminate prior to the trunk being checked for use at the end of the previous period, the first adjustment means is responsive to the termination process for adjusting the usage record associated with the previous period by incrementing the record by an amount representing the interval of time in the previous period. Also included is second adjustment means such as a decrementor responsive to the commencement process for adjusting the usage record associated with the previous period by, for example, decrementing the record by an amount representing the interval of time in the previous period. Thus, the accumulated usage record associated with the previous period is advantageously adjusted for each commencement and termination of use of a trunk prior to the trunk being checked for use during the present time period.

A departure in the art is that the two records are alternately designated primary and secondary usage records during successive time periods to record information on the accumulated usage of a trunk group during a given time period and to update the accumulated usage record of the previous time period all during the same period.

For example, in response to a call on a selected trunk between a calling and a called customer, a particular type of service is indicated for the selected trunk in a identified trunk group. The program controlled telephone office switch includes well-known means for determining the type of service based on the calling and called numbers associated with the call. In the illustrative method utilized by the switch, a first record for the identified trunk group is then adjusted by, for example, decrementing the record by the number of minutes from the start of the time period. When the call disconnects, the first record is again adjusted by, for example, incrementing the record by an amount representing the interval of time from the start of the time period to the disconnect. Thus, the difference between the incremented and the decremented amounts represents the length of the call. By way of example, this time period may be one hour in duration beginning and ending on the hour. At the end of the period, each trunk in the group is checked for use and the usage record adjusted for each trunk in use at the end of the period.

During each period, the secondary usage record is adjusted by, for example, incrementing the record by an amount representing the interval of time in the previous period for each trunk having a call thereon. Advantageously, the two records designated primary and secondary usage records alternately during successive time periods are utilized for parallel processing of the records during any given time period. This allows the secondary usage record to be adjusted for for a call in progress at the end of the previous hour. This update process is performed for each trunk in the office once during each period of time. When a call is disconnected prior to the trunk being checked for use, the record designated the primary usage record is adjusted as previously described, and the secondary usage record for that trunk is similarly adjusted by, for example, the 60 minute period. In this way, the records for the call in the present and previously occurring time period are accurately maintained.

When the call is disconnected, the primary usage record is adjusted for the period of time after the start of the hour.

Advantageously, alternating the designation of the two records allows the central processor of the switch to update trunk group usage when time permits during each period of time. As a result, the central processor of the switch does not have to devote time at precisely the end of each time period to update a single record. Furthermore, this alternating designation arrangement allows parallel processing to occur on the primary and secondary usage records on a as time permitted basis. This parallel processing technique also allows a central processor to store the secondary usage period for the previous time period on a disk file when time permits during the one hour period.

Trunk group usage may also be accumulated on an end office basis rather than a trunk group basis. This is particularly advantageous when a tandem office is interconnected between a point of presence in a toll network and an end office in a local exchange carrier network. Advantageously, this method and apparatus can be used for recording information on the accumulated usage for originating call attempts either in the point of presence toll switching office or in a local exchange carrier switching office. In addition, terminating call completions may also be recorded and measured in either the interconnect or local exchange carrier network. Call attempt and complering termination counts are also advantageously maintained to indicate the number of originating call attempt and terminating call completions on or to a particular office.

DETAILED DESCRIPTION

Figure 1:
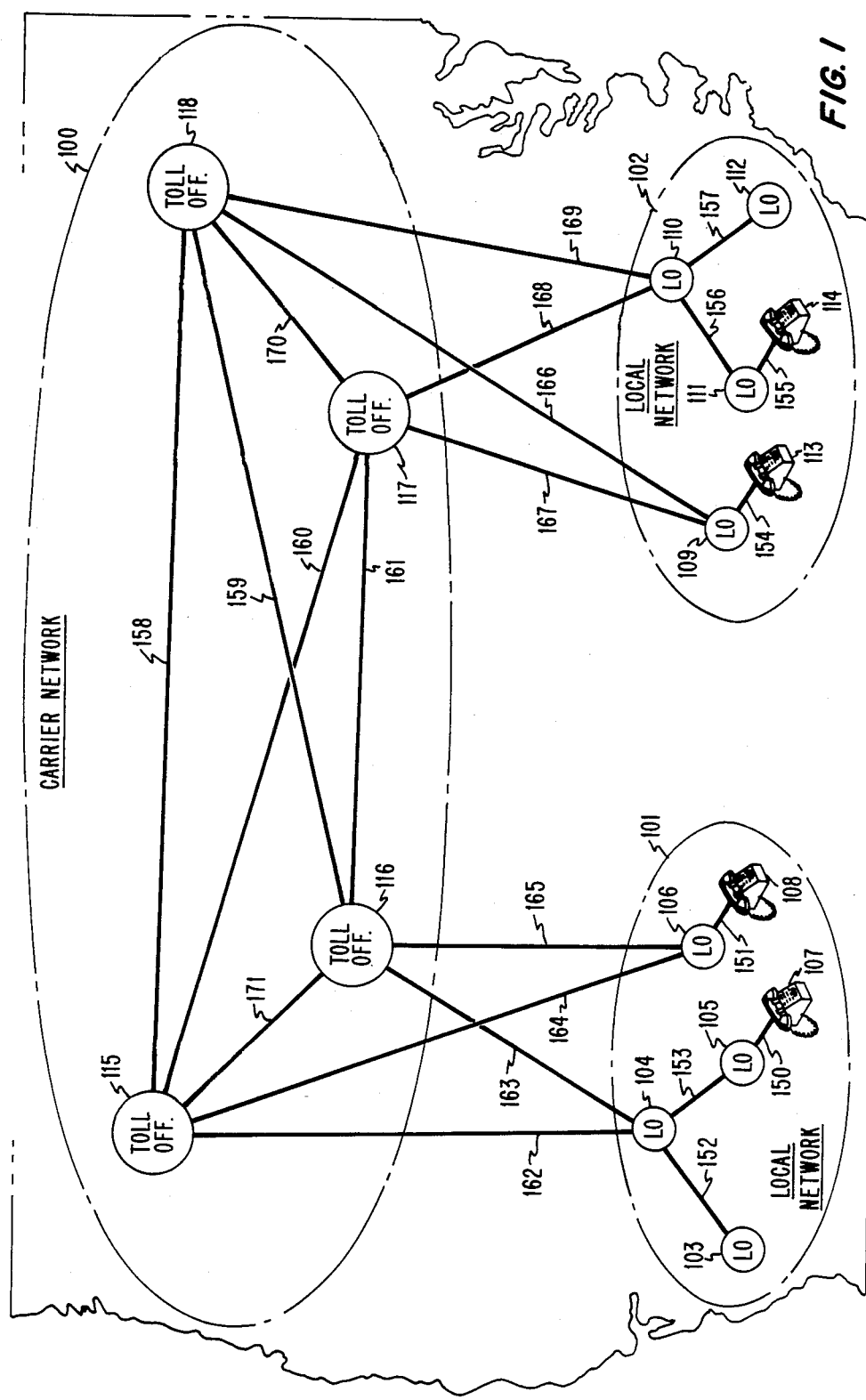
FIG. 1 depicts an illustrative interconnect carrier network interconnecting two local exchange carrier networks.

Depicted in FIG. 1 is an illustrative toll interconnect carrier network 100 including a plurality of communication lines such as well-known trunk groups 158-171 interconnected by toll switching system offices 115-118 for serving a plurality of local exchange carrier networks such as 101 and 102. The toll offices in interconnect network 100 include illustrative apparatus for and utilize an illustrative method of recording information on the accumulated usage of a trunk and in particular a group of trunks interconnecting a local network switching system office and a point of presence in the toll network such as a toll switching system office. Interconnect carriers use these accumulated usage records to verify access charges billed by the local network service provider. Accumulated usage records typically include the number of originating call attempts from a local office to a toll office and the sum total of each interval of time that a call connection is maintained on a trunk group. Also included in these usage records are the number of call completions that terminate on the local office from the toll office and the sum total of each interval of time that a call is maintained on the trunk group. Either one or both of the local and toll offices may utilize this apparatus for and method of recording information on the accumulated usage to subsequently verify the recorded usage with the other service provider.

Local network 101 includes one or more telephone switching system offices such as 103-106 which in turn serve a plurality of customers such as those at station sets 107 and 108 connected to respective offices 105 and 106 via communication lines 150 and 151, respectively. In addition, one or more of the local offices such as 104 may be used to interconnect other local offices such as 103 and 105 via trunk groups 152 and 153, respectively. An office interconnecting two or more local offices in a local network is commonly known as a tandem switching office. Similarly, local network 102 includes local switching offices 109–112 which in turn serve a plurality of customers such as those at telephone station sets 113 and 114 connected to respective offices 109 and 111 via communication lines 154 and 155, respectively. Tandem office 110 interconnects local offices 111 and 112 via trunk groups 156 and 157. All the customers served by a local office may not be served by the same interconnect carrier network. In fact, many local networks and the offices contained therein are served by several different interconnect carrier networks some of which may serve a different group of subscribing customers. When calls from a local end office are routed through a local tandem office, accumulated usage for calls originating from and terminating on the local end office may be maintained by the tandem or toll office using calling and called line identification.

By way of example, each of toll switching system offices 115–118 is suitably an electronic program-controlled switching system such as the 4 ESS TM digital switch available from AT&T. This digital switch is described in detail in *The Bell System Technical Journal*, Vol. 56, No. 7, September, 1977, and Vol. 60, No. 6, Part 2, July-August, 1981. These references may be consulted for a comprehensive understanding of the construction and operation of a toll switching system. Toll switching offices such as 115–118 selectively interconnect individual trunks in response to routing information, such as the telephone number of the called customer line received from the local office. Toll offices 115–118 serve local offices 103–107 and 109–112 via trunk groups 162–169, as shown.

Figure 2:
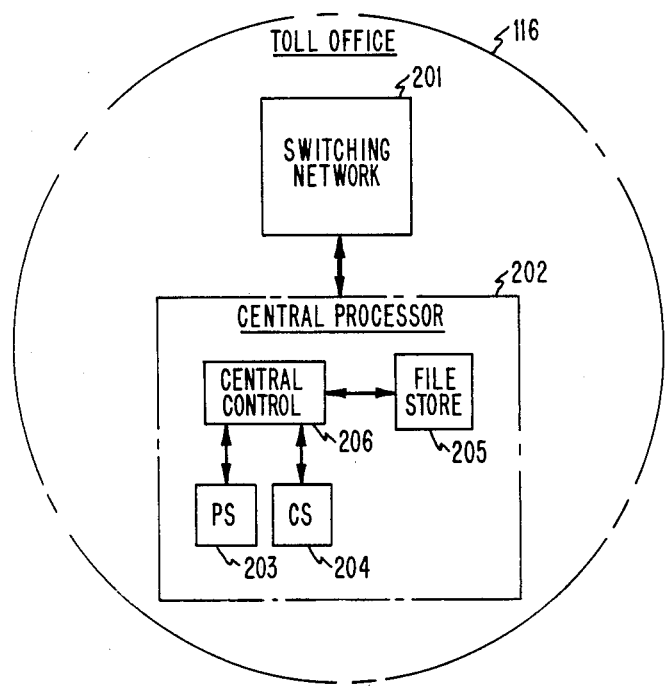
FIG. 2 is a block diagram of an illustrative toll switching system office included in the interconnect carrier network of FIG. 1.

Depicted in FIG. 2 is a block diagram of toll switching system 116 which includes switching network 201 and central processor 202. The switching network interconnects incoming and outgoing communications in a well-known manner under the control of program-controlled central processor 202. Central processor 202 includes a number of well-known program memories such as program store 203 for storing program instructions that control the operations of the switch, a number of well-known data memories such as call store 204 for storing temporary call data and the accumulated usage records of trunk groups and various types of services, and one or more well-known file store memories such as 205 all under the control of central control 206.

The majority of the logic, control and translations functions required for the operation of the toll switching system are performed by central processor 202. A typical processor suitable for use in the illustrative toll switching system is described in *The Bell System Technical Journal*, Vol. 56, No. 2, February, 1977.

Central control 206 is the information processing unit of the system and executes the program instructions resident in program store 203 using the call processing data in call store 204. File store 205 is a medium speed memory for storing backup copies of the program store and call processing data such as billing data and the accumulated usage records which will be discussed hereinafter.

By way of example, each of the local telephone switching offices 103–106 and 109–112 is suitably an electronic program-controlled switching system such as the 1A ESS TM switch available from AT&T. This switch is described in detail in *The Bell System Technical Journal*, Vol. 43 No. 5, Parts 1 and 2, September, 1964. An updated central processor suitable for use in the 1A ESS switch is described in *The Bell System Technical Journal*, Vol. 56, No. 2, February, 1970, previously cited and described. These cited references may be consulted for a more comprehensive understanding of the construction and operation of an electronic program-controlled local switching system.

Figure 3:
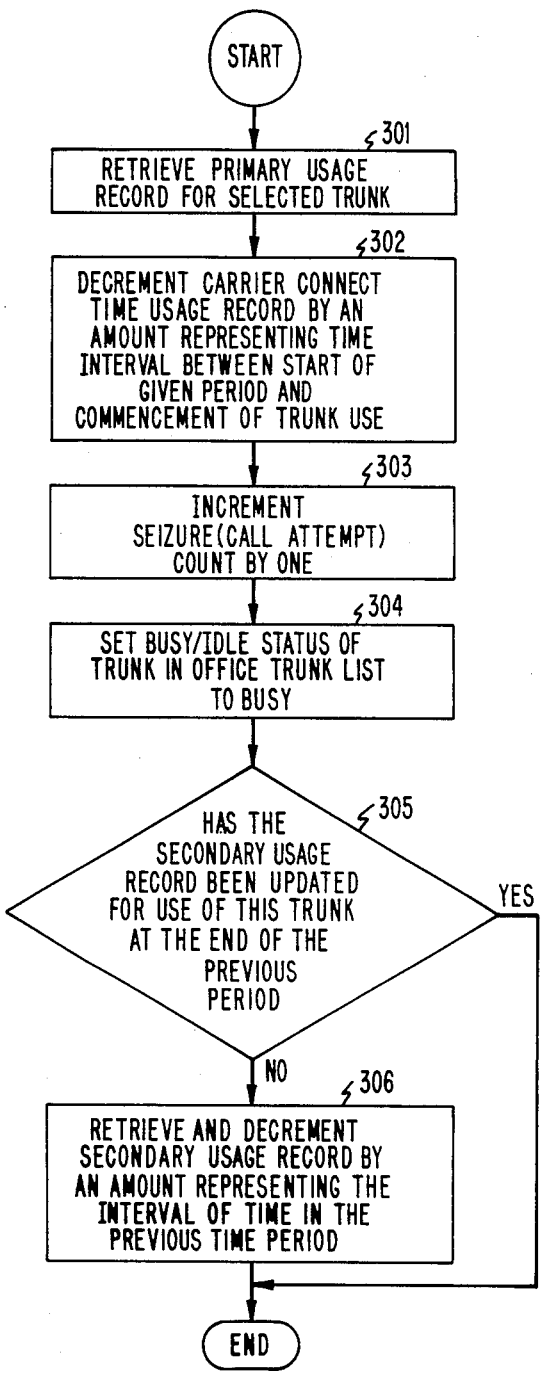
FIGS. 3-5 are flow diagrams of routines utilized by the switching office of FIG. 2 for implementing an illustrative method for recording accumulated usage of a group of trunks between the local exchange carrier network and the interconnect network of FIG. 1.
Figure 4:
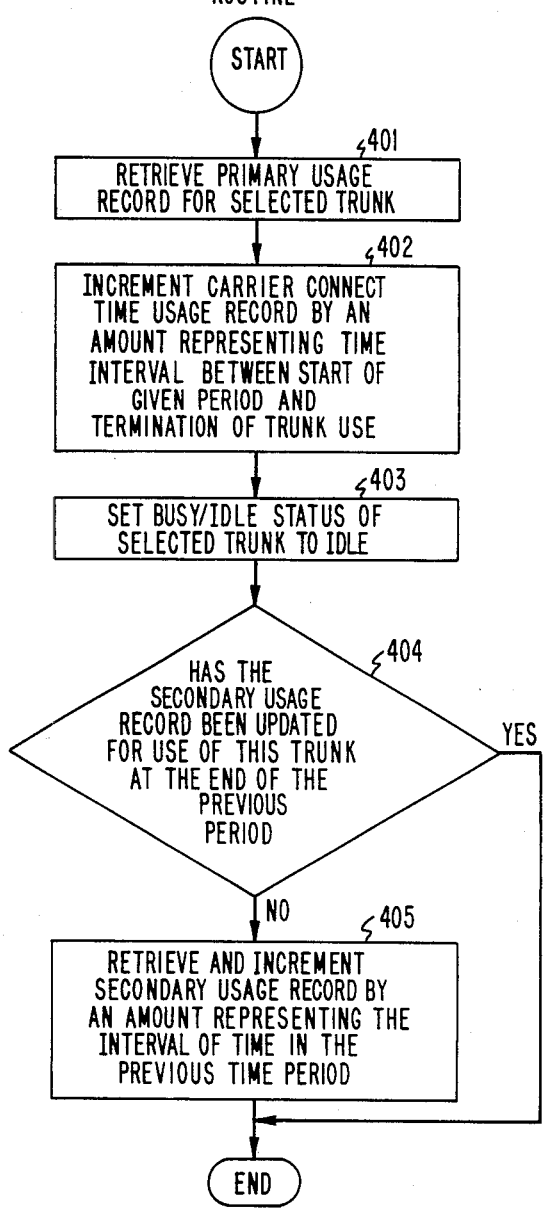
Figure 5:
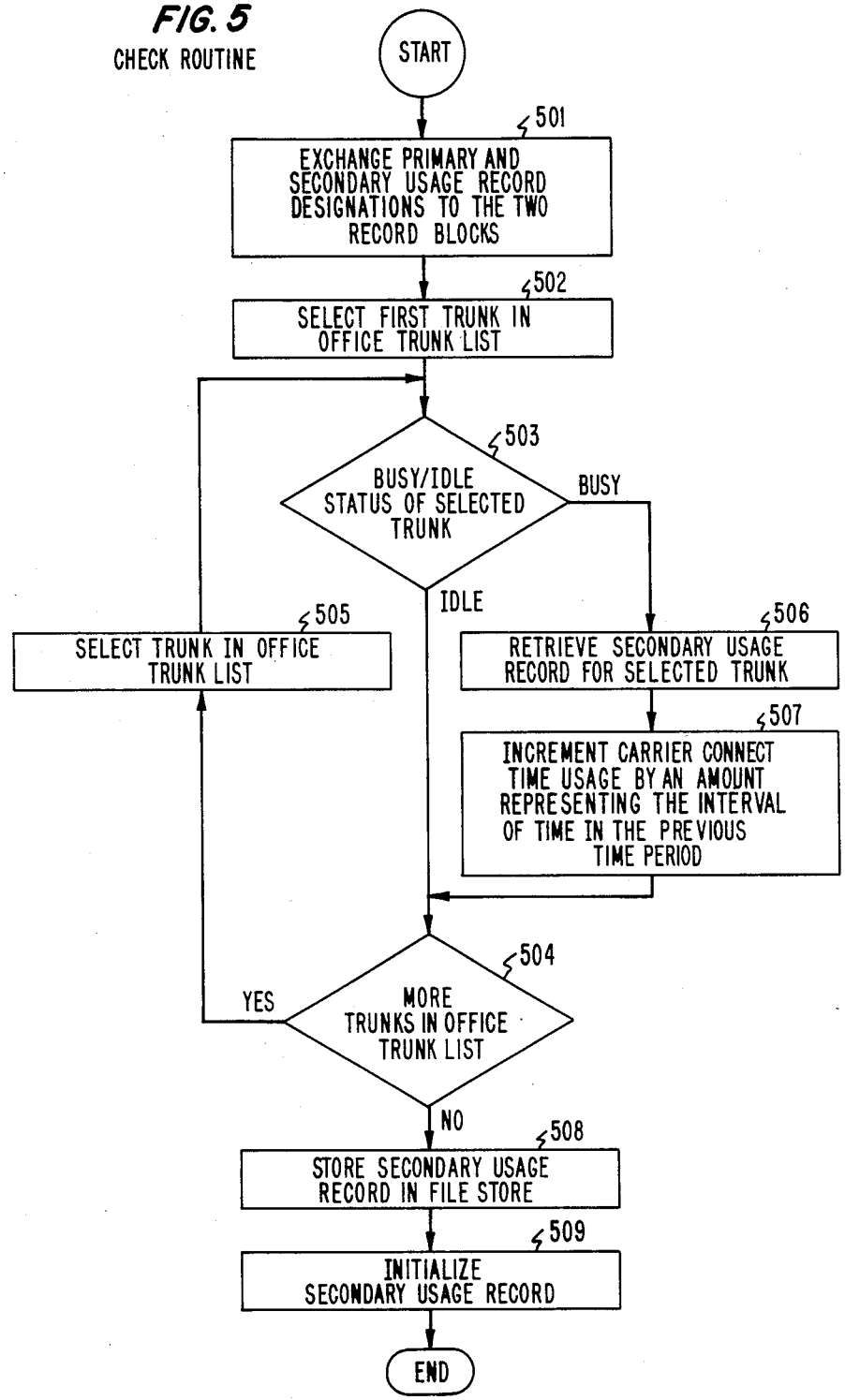

Depicted in FIGS. 3–5 are three flow diagrams illustrating one implementation of the method of recording information on the accumulated usage of a group of trunks such as trunk group 163 between local tandem office 104 and toll office 116. These flow diagrams represent program instruction routines which are stored in one or more program stores of the switching system.

Figure 6:
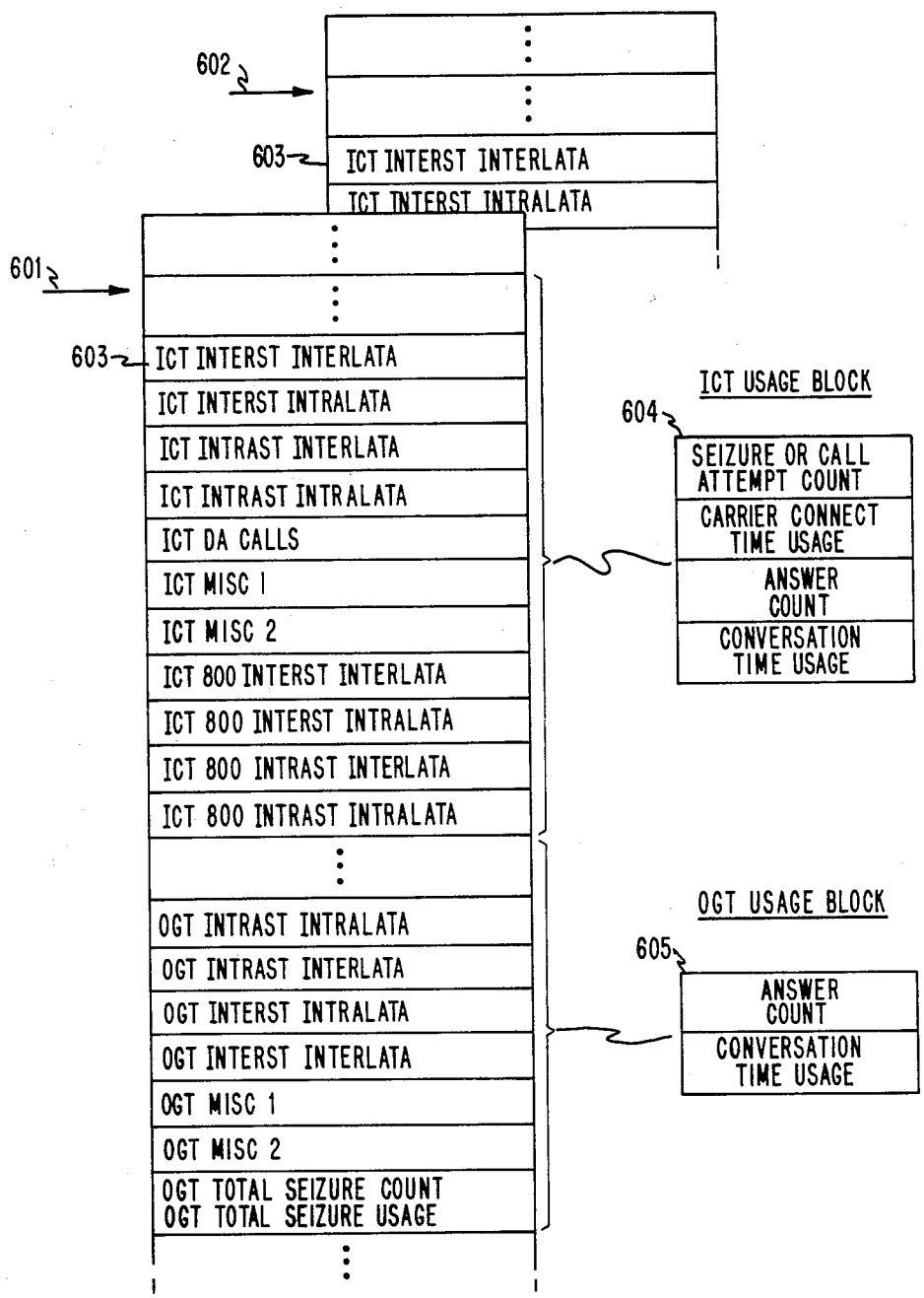
FIG. 6 depicts the layout of an illustrative trunk group usage record in the switching system of FIG. 2.

Depicted in FIG. 6 is a layout of an illustrative trunk group usage record which is stored in a data memory of the switching system such as call store 204 of switching system 116. Two trunk group usage records are maintained for each trunk group in the call store memory. Two address process pointers 601 and 602 designate one record as a primary usage record and the other record as a secondary usage record during one period of time and exchange the designations at the end of each period for use during the next successive time period. By way of example, the first record, designated a primary usage record, is utilized during a given time period to maintain a record of the accumulated usage of a trunk group during that time period. The second record, designated a secondary usage record, contains a record of the accumulated usage of the trunk group during another time period immediately preceding the given time period. The primary and secondary usage record designations of the two records alternate from one time period to the next. Each of the primary and second usage records constitutes a block of memory in, for example, call store 204, each having a different initial address. As shown in FIG. 6, each usage record block is segmented into smaller blocks one for each type of service associated with the trunk group such as 603. For example, each incoming trunk (ICT) subgroup block such as 603 includes a seizure or call attempt count, a carrier connect time usage, an answer count and a conversation time usage record as shown in ICT usage block 604. The seizure or call attempt count is pegged each time a trunk in the subgroup is seized for use. The carrier connect time usage represents the sum total of each interval of time that any trunk in the subgroup is used and is commonly measured between the recognition of well-known seizure and disconnect supervisory signals associated with the call. The answer count is pegged each time a well-known answer supervisory signal is received for a call. Lastly, the conversation time usage represents the sum total of each interval of time between the receipt of well-known answer and disconnect supervisory signal. Each ICT subgroup is accessed using for example a combination of either one or both of the calling and called line identification numbers in a well-known manner. Similarly, special service type calls such as "800" calls also have a separate ICT usage block based on the calling and called line identification numbers. Each outgoing trunk (OGT) subgroup in the trunk group also has a usage block such as 605 containing, for example, an answer count and a conversation time usage record for accumulating call terminating completions from one office to another.

For purposes of illustrating the method of recording information on the accumulated usage of a group of trunks, it will be assumed that four calls of the same service type originating from local office 106 through toll switching office 116 on trunk group 165 will be made during two time periods, the first from 10:00 to 11:00 and the second from 11:00 to 12:00. The first call commences at 10:10 on a first trunk in the group and terminates at 11:30. The second call commences at 10:20 on a second trunk in the group and terminates at 10:40. A third call commences on a third trunk in the group and terminates at 11:01. A fourth call commences at 11:02 again on the third trunk in the group and terminates at 11:40. The commencement and termination of these four calls along with the adjustment of the primary and secondary usage records are illustrated in Table 1.

TABLE 1

USAGE FOR CALLS OF A CATEGORY IN A TSG.

| call # | period | usage form 10-11 | usage from 11-12 |
|---|---|---|---|
| 1 | 10:10-11:30 | 50 | 30 |
| 2 | 10:20-10:40 | 20 | 0 |
| 3 | 10:30-11:01 | 30 | 1 |
| 4 | 11:02-11:40 | 0 | 38 |
|  | Total: | 100 | 69 |

11:00 - hourly updating start; 11:03 - the TSG gets update

| | BLOCK #1 usage (mins) record | counts | BLOCK #2 usage (mins) | counts record |
|---|---|---|---|---|
| 1. | 10:10 (#1) −10 | 1 | 0 | 0 |
| 2. | 10:20 (#2) −10 − 20 = −30 | 2 | 0 | 0 |
| 3. | 10:30 (#3) −30 − 30 = −60 | 3 | 0 | 0 |
| 4. | 10:40 (#2) −60 + 40 = −20 | 3 | 0 | 0 |
| 5. | 11:00 −20 | 3 | 0 | 0 |

Exchange usage record block designations.
Start secondary usage record update for each TSG.

| 6. | 11:01 (#3) −20 + 60 = 40 | 3 | 1 | 0 |
| 7. | 11:02 (#4) 40 − 60 = −20 | 3 | 1 − 2 = −1 | 1 |
| 8. | 11:03 |  |  |  |
|  | (#1) −20 + 60 = 40 | 3 | −1 | 1 |
|  | (#4) 40 + 60 = 100 | 3 | −1 | 1 |

Update secondary usage record for the selected trunk
Scan for trunks in use, increment secondary usage record one period (60 min) for each trunk found in use.

| 9. | 11:30 (#1) 0 | 0 | −1 + 30 = 29 | 1 |
| 10. | 11:40 (#4) 0 | 0 | 29 + 40 = 69 | 1 |

To initiate the first call, the customer at calling station 108, for example, dials the called line telephone number of subscriber line 154 serving station set 113. In response to the called number, local office 106 seizes a trunk in trunk group 165 to toll office 116 in a well-known manner. The toll office acknowledges the seizure of the trunk from local office 106 by returning an appropriate supervisory signal. The return of this acknowledgment supervisory signal indicates the commencement of use of the trunk between local office 106 and toll office 116. This originating call attempt stimulates central processor 202 to execute the commencement routine stored in program store 203 and depicted in FIG. 3. The central control retrieves the records from the primary usage record block associated with the incoming trunk subgroup communicating interstate and inter-LATA calls such as depicted in block 601 of FIG. 6 (block 301 of FIG. 3). Central control 206 retrieves the records of this particular primary usage block based on the calling and called line identification numbers received from the local office. Central control 206 adjusts the carrier connect time usage record by decrementing the record an amount representing the interval of time between the start of the period and the commencement of the trunk use (block 302). The central control also increments the seizure count by one (block 303). The call then progresses in a well-known manner to local end office 109 which signals called station 113. When the called party answers, an answer supervisory signal is returned to toll office 116 which then adjusts the answer count by incrementing the count and adjusts the conversation time usage record by decrementing the record an amount representing the time between the start of the period and the receipt of the answer signal.

Central control 206 then accesses an office trunk list stored in call store 204 to set the busy/idle status of the trunk to busy (block 304) and checks the update status of the trunk. The update status of the trunk indicates whether the trunk has been checked for use at the end of the previous time period and the secondary usage record updated. It will be assumed that the secondary usage record has been updated for the use of this trunk at the end of the previous time period (block 305). Control of the central control is now returned to the main call processing programs. The connect time usage record and seizure count in the primary usage record (Block 1) are −10 and 1 as illustrated in Item 1 of Table 1. The connect time usage record and seizure count in the secondary usage record (Block #2) are each assumed to be zero.

At the commencement of the second call on a second trunk in trunk subgroup 165 central processor 202 once again calls the commencement routine and adjusts the primary carrier connect time usage record by decrementing the record by an amount representing the interval of time from the start of the first period to the commencement of the trunk use. The seizure count is once again increased by one. As shown in Item 2 of Table 1, the carrier connect time usage record is now −30 and the seizure count is 2.

Similarly, at 10:30 when the third call on a third trunk in the trunk subgroup commences, the carrier connect time usage record is decremented by 30 to −60 and the user count is incremented by one to 3 as illustrated in Item 3 of Table 1.

At 10:40 when the second call terminates, central processor 202 passes control of central control 206 to the termination routine depicted in FIG. 4. A call termination is usually evidenced by the receipt of a well-known disconnect supervisory signal. The central control retrieves the primary usage record for the trunk experiencing the call termination (block 401). Central control then adjusts the carrier connect time usage record by incrementing the record by an amount (+40) representing the interval of time between the start of the given period to the termination of the call on the trunk (block 402). This results in a primary usage record of −20 as illustrated in Item 4 of Table 1. The central control also accesses the office trunk list in call store 204 to set the busy/idle status of the trunk to idle (block 403) and to check the update status of the trunk as well (block 404). For purposes of illustration, it will once again be assumed that the secondary usage record for the trunk has been previously updated. As a consequence, control of the central processor is once again returned to the main call processing programs.

At 11:00 o'clock, the first period ends and the second period begins with the central control calling the check routine depicted in FIG. 5. At the boundary of the two periods the check routine causes the central control to exchange the primary and secondary usage record designations of the two record blocks via the address process pointers (block 501). The second block is now designated the primary usage record and the first block is designated the secondary usage record although the records and counts in the two blocks are uneffected by the exchange of the designations. The central control checks each trunk in a group for use at the end of the first period by examining the busy/idle status of each trunk in the group once during the second period. This process is started at 11:00 as illustrated by Item 5 of Table 1. As time permits during the second period, the central control selects the first trunk in the office list (block 502) and determines its busy/idle status (block 503). When the busy/idle status of the selected trunk is idle, the next trunk in the office trunks list, if any, is selected and its busy/idle status determined (blocks 504 and 505). However, when the busy/idle status of the selected trunk is busy indicating the trunk is in use, the central control retrieves the secondary usage record (block 506) and adjusts the connect time usage record by incrementing the record by an amount representing the interval of time in the first period (block 507). This is illustrated by Item 8 in Table 1 when the selected trunk is in use and, as a result, 60 minutes is added to the connect time usage record. This is done for each trunk found in use at the end of the first period. Thus, the secondary usage record represents the sum total of each interval of time that each trunk in the group was in use during the first time period. After the secondary usage record has been adjusted for each trunk in use at the end of the first period, the central control writes the carrier connect time usage record into file store 205 (block 508). After the usage records have been written into the file store, central control 206 initializes all the secondary usage records and counts, for example, to zero for use during the next time period (block 509).

Since it is impractical to check the busy/idle status of each trunk at precisely the same time at the end of a period, this illustrative method employs several steps to accommodate the commencement and termination of use of a trunk prior to it being checked for use at the end of the previous period. For example, at 11:01, the third call on the third trunk in the trunk subgroup terminates prior to the trunk being checked for use at the end of the previous period. As previously described, the termination routine depicted in FIG. 4, is once again called by the central processor. The primary usage record is retrieved and incremented by an amount representing the interval of time from the start of the second period to the termination of the call at 11:01 (blocks 401 and 402). Next, central control sets the busy/idle status of the trunk to idle and checks the update status of the trunk in the office trunk list (blocks 403 and 404). At this time, this trunk has not been updated by the check routine, which is depicted in FIG. 5. As a result, the central control retrieves and adjusts the secondary usage record by incrementing the record an amount representing the interval of time in the previous time period (block 405). This is illustrated by Item 6 of Table 1.

At 11:02, the fourth call is commenced on the third trunk of the trunk subgroup. The central processor once again calls the commencement routine, depicted in FIG. 3, to adjust the primary and secondary usage records. As previously described, the primary usage record from the second block (Block No. 2) is incremented by an amount (2) representing the interval of time between the start of the second period and commencement of trunk use in the second period (blocks 301 and 302). Similarly, the seizure or call attempt count is incremented by one, and the busy/idle status set to busy (blocks 303 and 304). This is illustrated by Item 7 of Table 1 by subtracting two from the primary usage record and incrementing the seizure count by one. Since the update status of the trunk in the office trunk list indicates that the trunk has not yet been checked for use (block 305), the central processor retrieves and adjusts the secondary usage record by decrementing the record by an amount representing the interval of time in the previous time period (block 306). Incrementing and decrementing the secondary usage record by an amount representing the interval of time in the previous period adjusts the secondary usage record for commencements and terminations of trunk use prior to the trunk being checked for use at the end of the previous period, respectively.

At 11:03 when the first and third trunks are checked for use at the end of the first period, an amount (60) representing the first time period is added to the secondary usage record for each of the two trunks in use at 11:03. This is once again illustrated by Item 8 of Table 1. After all the trunks in the office trunk list have been checked for use, the secondary usage record is stored in file store 205 and the secondary usage record in the first record block is initialized for the next period.

At 11:30 when the call on the first trunk is terminated, the termination routine is once again called and central control increments the primary usage record by an amount (30) representing the time from the beginning of the second period to the termination of the call. This is illustrated by Item 9 of Table 1. Similarly, at 11:40 when the fourth call on the third trunk terminates, the central control increments the primary usage record by an amount (40) representing the 40 minutes from the start of the second period. This is illustrated by Item 10 of Table 1.

For outgoing trunks in the trunk group between local office 116 and local office 106, only the number of call terminating completions is recorded along with the conversation time usage as depicted in FIG. 6. Thus, the interconnect carrier only pays access charges for those calls terminating on a local network when the called party answers the call. With originating call attempts, the interconnect carrier pays an access charge regardless of whether the call attempt is completed or not. In addition, the carrier connect time usage from an end office, such as local offices 103 and 105 which are connected to toll office 106 via tandem switch 104 may also be accumulated. Here the calling line identification is used to determine whether the call is originated from end offices 103-105. The method and apparatus of this invention for recording information on the accumulating usage of a group of trunks may be maintained not only at the point of presence in the toll interconnect carrier network such as at toll offices 115-119, but also may be maintained in a local office that interconnects with the interconnect carrier network.

Figure 7:
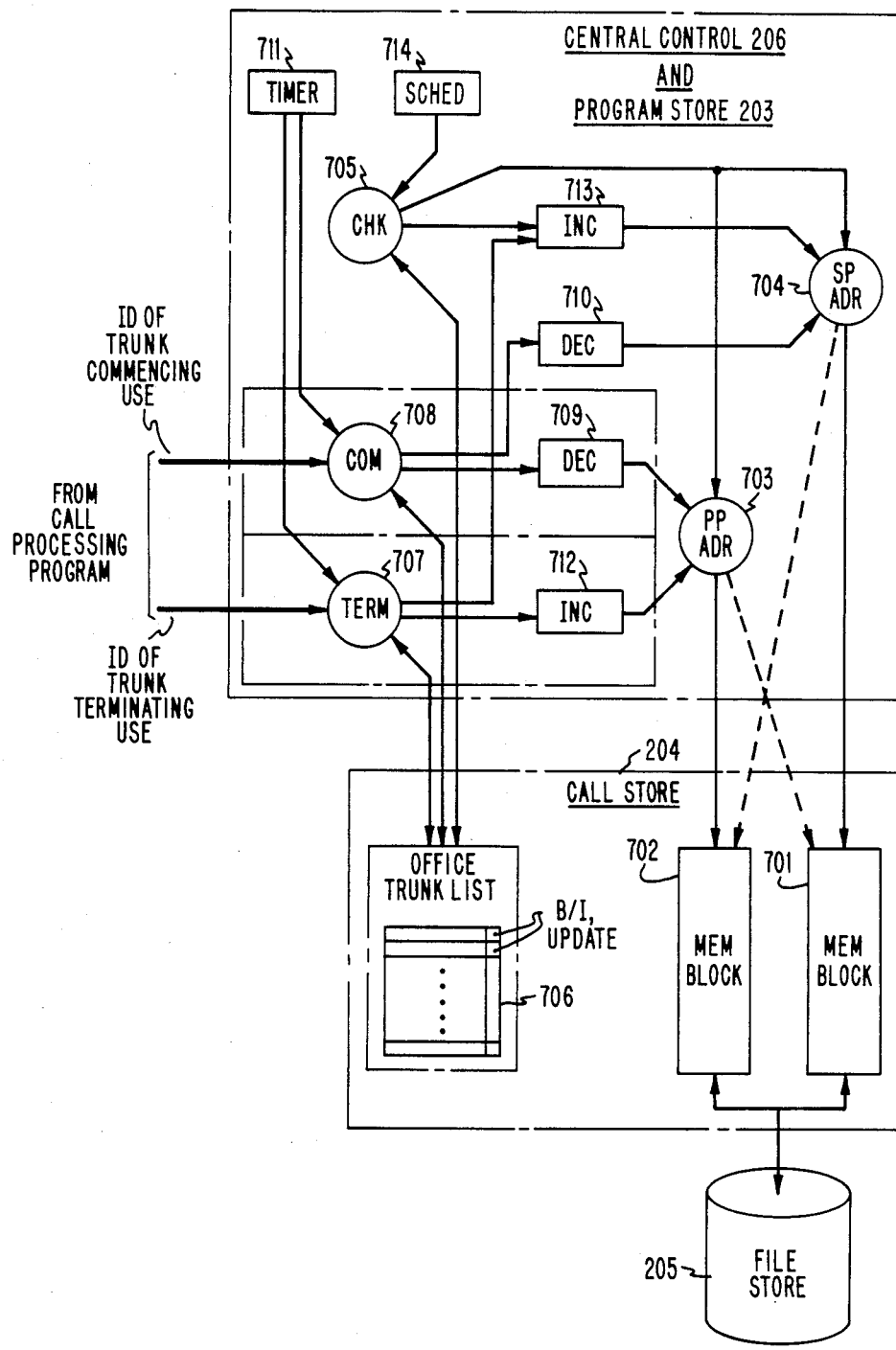
FIG. 7 depicts an overall flow/structure diagram of the method of an apparatus for recording accumulated usage of a group trunk.

An illustrative embodiment of the apparatus of this invention is depicted in the flow/structure diagram of FIG. 7. The first and second records are stored in two blocks of memory 701 and 702 of call store 204, each block having a different initial address. Access to these two records is via the two address process pointers 703 and 704. Primary and secondary address process pointers 703 and 704 under the control of check process 705 alternately designate the two records as primary and secondary usage records during successive periods of time in a well-known manner. The office trunk list 706 is also stored in a block of call stored 204 at an address different from the two usage records. As shown, the office trunk list includes a busy/idle status bit along with an update status bit for each trunk. Check, termination, and commencement processes 705, 707, and 708 check these status bits to adjust the primary and secondary usage records as previously described. As shown, commencement process 708 is responsive to the identity of a trunk commencing use from well-known call processing programs for adjusting the primary usage record by decrementing the record via variable time period decrement register 709 and for adjusting the secondary usage record by incrementing the record via adjustment means such as fixed time period decrement register 710. The time from the beginning of a time period to the commencement of trunk use is supplied by timer 711 in a well-known manner. Commencement process 708 sets and resets the busy/idle status bit to indicate the busy/idle status of the trunk and adjusts the secondary usage record by decrementing the record when the update status bit indicates that the trunk has not been checked for use at the end of the previous period.

Termination process 707 is responsive to the identity of a trunk terminating use for adjusting the primary usage record via variable time period increment register 712 and for adjusting the secondary usage record via adjustment means such as fixed time period increment register 713 in a well-known manner. Similar to commencement process 708, termination process accesses the office trunk list to set and reset the busy/idle status bit for an identified trunk and to check whether the trunk has been checked for use at the end of the previous period. Similar to the commencement process, the termination process receives the time from the beginning of a time period to the termination of trunk use from timer 711.

Check process 705 checks the update status of each trunk in office trunk list 706 for use at the end of a period and initializes the status after the use check. The check process is initiated in response to scheduler 714 indicating a transition or boundary between two time periods. Check process 705 is implemented using central control 206 under the control of the previously described check routine depicted in FIG. 5. Similarly, termination process 707 is implemented using central control 206 under the control of the previously described termination routine depicted in FIG. 4. Lastly, commencement process is implemented using central control 206 under the control of previously described commencement routine depicted in FIG. 3. All of these routines are stored in program store 203. Variable and fixed time incrementers and decrementers 709-710 and 712-713 along with timer 711 and scheduler 714 are all well-known structures in central control 206. The secondary usage record after being updated for trunk use at the end of the previous period is stored in file store 206. The usage records stored in file store 206 are sent to a regional processing center which processes the accumulated usage records to determine the access charges to be paid by the interconnect carrier.

It is to be understood that the above-described method and apparatus for recording information on the accumulated usage of a group of trunks between two offices is merely an illustrative embodiment of the principles of this invention and that numerous other methods and apparatus may be devised by those skilled in the art without departing from the spirit and scope of this invention. In particular, this method and apparatus may be implemented with any combination of hardware and software to record information on the accumulated usage of trunks using two records that are alternately designated primary and secondary usage records during successive time periods. This allows for parallel processing in which the primary usage record is used to accumulate usage for trunks during a given time period while the secondary usage record is updated by the check routine for trunks in use at the end of the time period previous to the given period. Although the various adjustment operations have been indicated as incrementing and decrementing, it is intended that those skilled in the art may use the opposite operation or any combination thereof with various combinations of positive and negative numbers to derive a usage record representative of the actual use of a trunk or group of trunks during a given timer period. It is also intended that any logic or arithmetic operation in addition to mathematical transformations are covered by the claims of this invention.

What is claimed is:

1. A method of recording information on the accumulated usage of a trunk comprising the steps of:

adjusting a first usage record by an amount representing the interval of time from the start of a first time period to commencement of use of said trunk each time the use of said trunk is commenced during said first period, adjusting said first usage record by an amount representing the interval of time from the start of said first period to termination of use of said trunk each time the use of said trunk is terminated during said first time period, checking said trunk for use at the end of said first period, and adjusting said first usage record by a first predetermined amount representing the interval of time in said first period when said checking indicates said trunk is in use at the end of said first period, said first usage record then representing the sum total of each interval of time that said trunk was in use during said first period.

2. The method of claim 1 further comprising storing said first usage record in storage means after said first usage record has been adjusted for said trunk when in use at the end of said first period.

3. The method of claim 1 wherein checking said trunk for use at the end of said first period includes checking said trunk in said group for use once during a second time period after said first period and wherein adjusting said first usage record for each trunk in use at the end of said first period includes adjusting said first usage record by said first predetermined amount each time during said second period the use of said trunk is terminated prior to checking the trunk for use during said second period, adjusting said first usage record by said first predetermined amount each time during said second period the use of said trunk in said group is commenced prior to checking the trunk for use during said second period, and adjusting said first usage record by said first predetermined amount for said trunk when said trunk is checked for use during said second period.

4. The method of claim 1 further comprising adjusting a second usage record by an amount representing the interval of time from the start of a second time period after said first period to commencement of use of said trunk each time the use of said trunk is commenced during said second period, adjusting said second usage record by an amount representing the interval of time from the start of said second period to termination of use of said trunk each time the use of said trunk is terminated during said second period, checking said trunk for use at the end of said second period, and adjusting said second usage record by a second predetermined amount representing the interval of time in said second period when said trunk is in use at the end of said second period, whereby said second usage record represents the sum total of each interval of time that said trunk was in use during said second period.

5. The method of claim 4 further comprising:

storing said first usage record in storage means after said first usage record has been adjusted for said trunk when in use at the end of said first period, and storing said second usage record in said storage means after said second usage record has been adjusted for said trunk when in use at the end of said second period.

6. The method of claim 4 wherein checking each trunk in said group for use at the end of said second period includes checking each trunk in said group for use once during a third time period after said second period and wherein adjusting said second usage record for said trunk in use at the end of said second period includes adjusting said second usage record by said second predetermined amount each time during said third period the use of said trunk is terminated prior to checking said trunk for use during said third period, adjusting said second usage record by said second predetermined amount each time during said third period the use of said trunk is commenced prior to checking said trunk for use during said third period, and adjusting said first usage record by said second predetermined amount for said trunk in use when the trunk is checked for use during said third period.

7. Method of recording accumulated usage of a group of trunks comprising the steps of:

decrementing a first usage record by an amount representing the interval of time from the start of a first time period to commencement of us of a trunk in said group each time the use of a trunk in said group is commenced during said first period, incrementing said first usage record by an amount representing the interval of time from the start of said first period to termination of use of a trunk in said group each time the use of a trunk in said trunk group is terminated during said first period, checking each trunk in said group for use once during a second time period, incrementing said first usage record by a first predetermined amount representing the interval of time in said first period for each trunk in said group in use when the trunk is checked for use during said second period, incrementing said first usage record by said first predetermined amount each time the use of a trunk in said group is terminated prior to checking the trunk for use during said second period, and decrementing said first usage record by said first predetermined amount each time the use of a trunk in said group is commenced prior to checking the trunk for use during said second period, whereby said first usage record represents the sum total of each interval of time that each trunk in said group was in use during said first time period.

8. The method of claim 7 further comprising storing said first usage record in storage means after all the trunks in said group have been checked for use during said second period and said first usage record has been incremented by said first predetermined amount for each trunk in use when the trunk is checked for use during said second period.

9. The method of claim 7 further comprising decrementing a second usage record by an amount representing the interval of time from the start of a second time period to commencement of use of a trunk in said group each time the use of a trunk in said group is commenced during said second period, incrementing said second usage record by an amount representing the interval of time from the start of said second period to termination of use of a trunk in said group each time the use of a trunk is terminated during said second period, checking each trunk in said group for use once during a third time period after said second period, incrementing said second usage record by a second predetermined amount representing the interval of time in said second time period for each trunk in said group in use when the trunk is checked for use during said second period, incrementing said second usage record by said second predetermined amount each time the use of a trunk in said group is terminated prior to checking the trunk for use during said third period, and decrementing said second usage record by said second predetermined amount each time the use of a trunk in said group is commenced prior to checking the trunk for use during said third period, whereby said second usage record represents the sum total of each interval of time that each trunk in said group was in use during said second period.

10. The method of claim 9 further comprising storing said first usage record after all the trunks in said group have been checked for use during said second period and said first usage record has been incremented by said first predetermined amount for each trunk in use when the trunk is checked for use during said second period.

11. The method of claim 10 further comprising initializing said first usage record for use during said third period after said first usage record has been stored.

12. The method of claim 10 further comprising storing said second usage record after all the trunks in said group have been checked for use during said third period and said second usage record has been incremented by said second predetermined amount for each trunk in use when the trunk is checked for use during said third period.

13. The method of claim 12 further comprising initializing said second usage record for use during a fourth time period after said second usage record has been stored.

14. The method of claim 9 further comprising incrementing an attempt count each time the use of a trunk in said group is commenced during said second period, whereby said attempt count represents the sum total of the number of times that each use of a trunk in said group has been commenced during said second period.

15. The method of claim 9 further comprising incrementing a termination count each time the use of a trunk in said group is terminated during said second period, whereby said termination count represents the sum total of the number of times that each use of a trunk in said group has been terminated during said second period.

16. The method of claim 9 wherein said group has a plurality of service usage records associated therewith each representing the sum total of each interval of time that each trunk in said group has been in use with a unique type of call thereon during said second period and said method further comprises recording accumulated usage of each trunk in said group having a call thereon associated with a particular one of said service usage records during said second period.

17. The method of claim 7 further comprising incrementing an attempt count each time the use of a trunk in said group is commenced during said first period whereby said attempt count represents the sum total of the number of times that each use of a trunk in said group has been commenced during said first period.

18. The method of 7 wherein said group has a plurality of service usage records associated therewith each representing the sum total of each interval of time that each trunk in said group has been in use with a unique type of call thereon during said first period and said method further comprises recording accumulated usage of each trunk in said group having a call thereon associated with a particular one of said service usage records during said first period.

19. Method of recording accumulated usage of a group of trunks having calls from a particular telephone office thereon comprising the steps of:
    decrementing a first usage record by an amount representing the interval of time from the start of a first time period to commencement of a call from said office on a trunk in said group each time a call from said office on a trunk in said group is commenced during said first time period,
    incrementing said first usage record by an amount representing the interval of time from the start of said first period to termination of a call from said office on a trunk in said group each time a call from said office on a trunk in said group is terminated during said first period,
    checking each trunk in said group for a call from said office thereon at the end of said first period, and
    incrementing said first usage record by a first predetermined amount representing the interval of time in said first period for each trunk in said group having a call from said office thereon at the end of said first period, whereby said first usage record represents the sum total of each interval of time that each trunk in said group has had a call from said office thereon during said first period.

20. The method of claim 19 further comprising storing said first usage record after said first usage record has been incremented for each trunk in said group having a call from said office thereon at the end of said first period.

21. The method of claim 19 wherein checking each trunk in said group for a call from said office at the end of said first period includes
    checking each trunk in said group for a call from said office thereon once during a second time period after said first period and wherein incrementing said first usage record for each trunk having a call from said office thereon at the end of said first period includes
    incrementing said first usage record by said first predetermined amount each time during said second period a call from said office on a trunk in said group is terminated prior to checking the trunk for a call from said office thereon during said second period,
    decrementing said first usage record by said first predetermined amount each time during said second period a call from said office is commenced on a trunk in said group prior to checking the trunk for a call from said office thereon during said second period, and
    incrementing said first usage record by said first predetermined amount for each trunk having a call from said office thereon when the trunk is checked for having a call from said office thereon during said second period.

22. The method of claim 19 further comprising
    incrementing a second usage record by an amount representing the interval of time from the start of a second time period to termination of a call from said office on a trunk in said group each time a call from said office is terminated on a trunk in said group during said second period,
    checking each trunk in said group for a call from said office thereon at the end of said second period, and
    incrementing said second usage record by a second predetermined amount representing the interval of time in said second period for each trunk in said group having a call from said office thereon at the end of said second period, whereby said second usage record represents the sum total of each amount of time that each trunk in said group has had a call from said office thereon during said second period.

23. The method of claim 22 further comprising storing said first usage record after said first usage record has been incremented for each trunk in said group having a call from said office thereon at the end of said first period, and
    storing said second usage record after said second usage record has been incremented for each trunk in said group having a call from said office thereon at the end of said second period.

24. The method of claim 22 wherein checking each trunk in said group for a call from said office thereon at the end of said first period includes checking each trunk in said group for a call from said office thereon once during a third time period after said second period and wherein incrementing said second usage record for each trunk having a call from said office thereon at the end of said second period includes incrementing said second usage record by said second predetermined amount each time during said third period a call from said office on a trunk in said group is terminated prior to checking the trunk for a call from said office thereon during said third period, decrementing said second usage record by said second predetermined amount each time during said third period a call from said office is commenced on a trunk in said group prior to checking the trunk for a call from said office thereon during said third period, and incrementing said second usage record by said second predetermined amount for each trunk having a call from said office thereon when the trunk is checked for having a call from said office thereon during said third period.

25. Apparatus for recording information on the accumulated usage of of trunks comprising:

first storage means for storing a first usage record representing the sum total of each interval of time that trunk is in use during a first time period, commencement means for adjusting said first usage record by an amount representing the interval of time from the start of said first period to commencement of use of said trunk each time the use of said trunk is commenced during said first period, termination means for adjusting said first usage record by an amount representing the interval of time from the start of said first period to termination of use of said trunk each time the use of said trunk is terminated during said first period, check means for checking said trunk for use at the end of said first period, and first adjustment means responsive to said check means for adjusting said first usage record by a first predetermined amount representing the interval of time in said first period for said trunk when in use at the end of said first period.

26. The apparatus of claim 25 further comprising second storage means for storing said first usage record after said first usage record has been adjusted for said trunk when in use at the end of said first period.

27. The apparatus of claim 26 wherein said check means is responsive to the end of said first period for checking said trunk in said group for use once during a second time period after said first period, and said first adjustment means is responsive to said termination means for adjusting said first usage record by said first predetermined amount each time during said second period the use of said trunk is terminated prior to said check means checking said trunk for use during said second period, and wherein said apparatus further comprises second adjustment means responsive to said commencement means for adjusting said first usage record by said first predetermined amount each time during said second period the use of said trunk is commenced prior to said check means checking said trunk for use during said second period.

28. The apparatus of claim 25 further comprising second storage means for storing a second usage record representing the sum total of each interval of time that said trunk is in use during a second time period after said first period and wherein said first commencement means is responsive during said second period for decrementing said second usage record by an amount representing the interval of time from the start of said second period to commencement of use of said trunk each time the use of said trunk in said group is commenced during said second period, said termination means is responsive during said second period for adjusting said second usage record by an amount representing the interval of time from the start of said second period to termination of use of said trunk each time the use of said trunk is terminated during said second period, said check means is responsive to the end of said second period for checking said trunk for use at the end of said second period, and said first adjustment means is responsive to said check means for adjusting said second usage record by a second predetermined amount representing the interval of time in said second period for said trunk when in use at the end of said second period.

29. The apparatus of claim 28 further comprising third storage means for storing said first usage record after said first usage record has been adjusted for said trunk in use at the end of said first period and said second usage record after said second usage record has been adjusted for said trunk when in use at the end of said second period.

30. The apparatus of claim 28 wherein said check means is responsive to the end of said second period for checking said trunk for use once during said third time period after said second period, said first adjustment means is responsive during said third period for adjusting said second usage record by said second predetermined amount each time during said third period the use of said trunk in said group is terminated prior to said check means checking said trunk for use at the end of said second period, and said second adjustment means is responsive during said third period for adjusting said second usage record by said second predetermined amount each time during said third period the use of said trunk is commenced prior to said check means checking said trunk for use at the end of said second period.

31. Apparatus for recording accumulated usage of a group of trunks comprising:

first storage means for storing a first usage record representing the sum total of each interval of time that each trunk in said group is in use during a first time period, commencement means for decrementing said first usage record by an amount representing the interval of time from the start of said first period to commencement of use of a trunk in said trunk group each time the use of a trunk in said group is commenced during said first period, termination means for incrementing said first usage record by an amount representing the interval of time from the start of said first period to termination of use of a trunk in said group each time the use of a trunk in said group is terminated during said first period, check means responsive to the end of said first period for checking each trunk in said group for use once during a second time period after said first period, incrementor means responsive to said check means for incrementing said first usage record by a first predetermined amount representing the interval of time in said first period each time during said second period a trunk in said group is in use when said check means checks the trunk in said group for use and responsive to said termination means for incrementing said first usage record by said first predetermined amount each time during said second period the use of a trunk in said group is terminated prior to said check means checking the trunk in said group for use, and decrementor means responsive to said commencement means for decrementing said first usage record by said first predetermined amount each time during said second period the use of a trunk in said group is commenced prior to said check means checking the trunk in said group for use.

32. The apparatus of claim 31 further comprising:

second storage means for storing a second usage record representing the sum total of each interval of time that each trunk in said trunk group is in use during said second period, and wherein said commencement means is responsive during said second period for decrementing said second usage record by an amount representing the interval of time from the start of said second period to commencement of use of a trunk in said group each time the use of a trunk is commenced during said second period, said commencement means is responsive during said second period for incrementing said second usage record an amount representing the interval of time from the start of said second period to termination of use of a trunk in said group each time the use of a trunk is terminated during said second period, said check means is responsive to the end of said second period for checking each trunk in said group for use once during a third time period after said second period, said incrementor means is responsive during said third period to said check means for incrementing said second usage record by a second predetermined amount representing the interval of time in said second period each time during said third period a trunk in said group is in use when said check means checks the trunk in said group for use and to said termination means for incrementing said second usage record by said second predetermined amount each time during said third period the use of a trunk in said trunk group is terminated prior to said check means checking the trunk in said group for use, and said decrementor means is responsive during said third period to said commencement means for decrementing said second usage record by said second predetermined amount each time during said third period the use of a trunk said trunk group is commenced prior to said check means checking the trunk in said group for use.

33. The apparatus of claim 32 further comprising third storage means for storing said first usage record after all trunks in said group have been checked for use during said second period and said first usage record has been incremented for each trunk in said group in use during said second period when the trunk is checked for use and said second usage record after all the trunks in said group have been checked during said third period and second usage record has been incremented for each trunk in said group in use during said third when the trunk is checked for use.

34. A method of recording accumulated usage of a group of trunks utilizing first and second records alternately designated primary and secondary usage records during successive ones of a plurality of consecutive time periods and comprising the steps during a given one of said periods of:

adjusting said primary usage record by an amount representing the interval of time from the start of said given period to commencement of use of a trunk in said group each time the use of a trunk in said group is commenced during said given period, adjusting said primary usage record by an amount representing the amount of time from the start of said given period to termination of use of a trunk in said group each time during said given period the use of a trunk in said trunk group is terminated during said given period, checking each trunk in said group for use once during said given period, adjusting said secondary usage record by a first predetermined amount representing the amount of time in the time period occurring previous to said given period each time said checking indicates a trunk in said trunk group is in use;

adjusting said secondary usage record by said first predetermined amount each time the use of a trunk in said trunk group is terminated prior to checking the trunk for use during said given period, and adjusting said secondary usage record by said first predetermined amount each time the use of a trunk in said trunk group is commenced prior to checking the trunk for use during said given time period, whereby said secondary usage record represents the sum total of each interval of time that each trunk in said group was in use during the previous time period.

35. The method of claim 34 further comprising storing said secondary usage record after all the trunks in said group have been checked for use during said given period and said secondary usage record has been adjusted by said first predetermined amount for each trunk in use during said given period when the trunk is checked for use.

36. The method of claim 35 further comprising exchanging said primary and secondary designations of said first and second records at the end of said given period and repeating said aforementioned steps for the next successive time period.

37. Apparatus for recording accumulated usage of a group of trunks comprising:

first storage means for storing first and second records alternately designated primary and secondary usage records during successive ones of a plurality of consecutive time periods;

commencement means for adjusting said primary usage record by an amount representing the interval of time from the start of a given time period to commencement of use of a trunk in said trunk group each time the use of a trunk in said group is commenced during said given period, terminations means for adjusting said primary usage record by an amount representing the interval of time from the start of said given period to termination of use of a trunk in said group each time the use of a trunk in said group is terminated during said given period, check means for checking each trunk in said group for use once during said given period, first adjustment means responsive to said check means for adjusting said secondary usage record by a first predetermined amount representing the interval of time in the time period occurring previous to said given period each time during said given period a trunk in said group is in use when said check means checks the trunk in said group for use and responsive to said termination means for said secondary usage record by said first predetermined amount each time during said given period the use of a trunk in said group is terminated prior to said check means checking the trunk in said group for use, and second adjustment means responsive to said commencement means for said primary usage record by predetermined amount each time during said given period the use of a trunk in said group is commenced prior to said check means checking the trunk in said group for use.

38. The apparatus of claim 37 further comprising second storage means for storing said secondary usage record after all the trunks in said group have been checked for use during said given period and said secondary usage record has been incremented for each trunk in said group in use during said given period when the trunk is checked for use.

39. The apparatus of claim 38 further comprising means responsive to said check means for exchanging said primary and secondary usage record designations of said first and second records at the end of said given period.

40. Apparatus for accumulating information on the actual usage of interconnect carrier trunks by a local exchange carrier for use in verifying local carrier access charges to the interconnect carrier by said local carrier comprising:

memory means storing accumulation information for usage of each said trunk for calls served thereby, and program-controlled processor means having a plurality of program instruction routines for controlling an accumulation of information for storage in said memory means for the actual usage of each trunk on each call served thereby, a first one of said instruction routines being activated by said processor in response to a commencement of said each call on each said trunk for initiating an accumulating of usage information for each said trunk, and a second one of said instruction routines being activated by said processor in response to a termination of each said call on said each trunk for accumulating usage information on said termination of each said call on said each trunk.

41. The apparatus of claim 40 further comprising a first memory cooperative with said processor under the control of said first routine for storing said usage information on the commencement of said call on said trunk.

42. The apparatus of claim 41 further comprising commencement means for decrementing said usage information by an amount representing the interval of time between the start of a predetermined time period and the commencement of said call on said trunk in response to the commencement of said call on said trunk.

43. The apparatus of claim 40 further comprising a first memory cooperative with said processor under the control of said second routine for storing said usage information on the termination of said call on said trunk.

44. The apparatus of claim 43 further comprising termination means for incrementing said usage information by an amount representing the interval of time between the start of a predetermined period and the termination of said call on said trunk in response to the termination of said call on said trunk.

45. The apparatus of claim 40 wherein a third one of said routines is activated by said processor means in response to the end of a predetermined time period for updating said usage information when said call is on said trunk at the end of said predetermined period.

46. The apparatus of claim 45 further comprising incrementor means cooperative with said third routine for incrementing said usage information by an amount representing the interval of time in said predetermined period when said call is on said trunk at the end of said predetermined period.

47. The apparatus of claim 40 further comprising a main call processing program for controlling said first a second routines in response respectively to call commencements and terminations on said trunk.

48. The apparatus of claim 40 further comprising a first memory for storing primary usage information representing the actual usage of a trunk during a predetermined time period and a second memory for storing secondary usage information representing the actual usage of said trunk during another time period occurring previous to said predetermined period.

49. The apparatus of claim 48 wherein a third one of said routines is activated by said processor in response to the end of said previous time period for updating said secondary usage record when said call is on said trunk at the end of said previous period.

50. The apparatus of claim 49 further comprising incrementor means cooperative with said processor under the control of said third routine for incrementing said secondary usage information by a predetermined amount representing the interval of time in said previous period when said call is on said trunk at the end of said previous period.

51. The apparatus of claim 49 wherein said incrementor means is responsive to said processor under the control of said first routine for incrementing said secondary usage information by said predetermined amount when another call commences on said trunk prior to said processor under the control of said third routine updating said secondary usage information for said call on said trunk at the end of said previous period.

52. The apparatus of claim 49 further comprising decrementor means responsive to said processor under the control of said second routine for decrementing said secondary usage information by said predetermined amount when said call or any other call terminates on said trunk prior to said processor means under the control of said third routine updating said secondary usage information for said call on said trunk at the end of said previous period.

53. The apparatus of claim 40 further comprising a block of memory for each group of trunks incoming and outgoing from said interconnect carrier.

54. The apparatus of claim 53 wherein each of said blocks of memory further comprising subblocks of memory for different types of service calls associated with each of said incoming and outgoing trunk groups.

55. An interconnect carrier system for recording charges assessed by a local telephone company to the interconnect carrier for providing access for its customers over trunks to the interconnect carrier network, said system comprising
means responsive to a receipt of a call over one of said trunks for controlling a usage record in a memory for commencement of use of said one trunk, and
means responsive to termination of said call for controlling said usage record to determine actual usage of said trunk on said call at said interconnect carrier and an access charge by said telephone company to said carrier for usage of said trunk.

56. An interconnect carrier system for recording charges assessed by a local telephone company to the interconnect carrier for providing access to its customers over trunks from the interconnect carrier network to the local telephone company, said system comprising:
means responsive to a receipt of a call over one of said trunks for controlling a usage record in a memory for commencement of use of said one trunk, and
means responsive to termination of said call for controlling said usage record to determine actual usage of said trunk on said call at said interconnect carrier and an access charge by said telephone company to said carrier for usage of said trunk.

57. The system of claim 56 further comprising means responsive to the end of a time period for updating said usage record for usage of said trunk on said call during said time period.

58. The system of claim 57 said updating means includes check means for checking said trunk for said call at the end of said period and means responsive to said check means for controlling said usage record for usage of said trunk for said call at the end of said period.

59. A method for use by an interconnect carrier to accumulate information on the actual usage of interconnect carrier trunks by a local exchange carrier for use in verifying local carrier access charges to the interconnect carrier by said local carrier comprising the steps of:
establishing a usage record for said interconnect carrier trunks upon commencement of a call on one trunk of said interconnect carrier trunks, and
adjusting said usage record for a termination of said call on said one trunk upon said termination of said call of said one trunk to accumulate an actual time duration of usage for said one trunk.

60. The method of claim 59 further comprising updating said usage record at the end of a predetermned period by an amount representing the interval of time in said predetermined period when said call is on said one trunk at the end of said predetermined period.

61. The method of claim 60 further comprising comparing said usage record with another usage record for said period from said local exchange carrier.

* * * * *